United States Patent [19]

Jimerson et al.

[11] Patent Number: 4,567,375
[45] Date of Patent: Jan. 28, 1986

[54] SOFT SWITCH WITH POSITIVE ON AND OFF STATES

[76] Inventors: Bruce D. Jimerson, 6415 Corsini Pl., Rancho Palos Verdes, Calif. 90274; Henry H. Nakasone, 1672 Camrose Way, Anaheim, Calif. 92802

[21] Appl. No.: 182,996

[22] Filed: Sep. 2, 1980

[51] Int. Cl.⁴ .................. H01H 29/20; H01H 35/02
[52] U.S. Cl. ...................... 307/98; 200/186; 200/187; 200/189; 323/352; 323/905; 315/362
[58] Field of Search ............... 307/98, 139, 141, 96, 307/252 B, 252 N; 200/183, 220, 185, 186, 187, 188, 189, 33 R, 33 A, 34; 315/362, 194; 323/352, 362, 905

[56] References Cited

U.S. PATENT DOCUMENTS

| | | | |
|---|---|---|---|
| 2,972,025 | 2/1961 | Banks | 200/33 A |
| 3,531,712 | 9/1970 | Cecchini | 307/98 X |
| 4,101,811 | 7/1978 | Dandrel et al. | 315/362 X |

Primary Examiner—Stafford D. Schreyer

[57] ABSTRACT

The specification discloses an electromechanical time delay combination for gradually applying power to the filament of an incandescent lamp. Following actuation to the "on" state, the conduction angle gradually changes from zero to 360°. Following deactuation, the conduction angle lingers at 180° for several seconds before returning to the non-conduction state. A set of mechanical contacts and a potentiometer may be added to effect proportional dimming.

7 Claims, 14 Drawing Figures

116 AND S4 OPERATED FROM THUMBWHEEL 118

SOFT SWITCH WITH POSITIVE ON AND OFF STATES

BACKGROUND OF THE INVENTION

Cross reference to related applications

1. Lighting Control System for Incandescent Lamps by Henry H. Nakasone, U.S. Pat. No. 3,898,516, Aug. 5, 1975.
2. Circuit for Producing a Gradual Change in Conduction Angle by Henry H. Nakasone, U.S. Pat. No. 4,008,416, Feb. 15, 1977.
3. Soft Switch with Rapid Recovery Circuit by Henry H. Nakasone, U.S. Pat. No. 4,152,607, May 1, 1979.
4. Light Switch by Henry H. Nakasone and Bruce D. Jimerson, U.S. Pat. No. 4,155,015, May 15, 1979.
5. Momentary Contact Light Switch by Henry H. Nakasone and Bruce D. Jimerson, U.S. Pat. No. 4,152,608, May 1, 1979.
6. U.S. patent application entitled "Electronic Light Switch" by Bruce N. Jimerson and Henry H. Nakasone, filed Apr. 27, 1979, Ser. No. 033,864 now U.S. Pat. No. 4,350,903.

DESCRIPTION OF THE PRIOR ART

The above-referenced prior art patents have two objectionable shortcomings in that the control element (typically a triac) dissipates some power in the "on" state, and the cicuitry draws some (albiet small) current in the "off" state. What is actually desired is a gradual "turn-on" circuit and delayed "turn-off" circuit which is positive; i.e., short circuited in the quiescent "on" state and open circuited in the quiescent "off" state. It is desirable in addition, that these functions be achieved without the use of mechanical contacts or electrothermal parts which customarily exhibit relatively short life times compared to electronic components.

Accordingly, a primary object of the invention is to provide a switch which will gradually change from a totally open circuit impedance to a totally short circuited impedance following actuation to the "on" state.

Another object of the invention is to provide a switch which will abruptly change from a short circuit impedance to an intermediate impedance at the time of deactuation to the "off" state, followed after a time interval to a change from the intermediate impedance to a totally open circuit impedance.

Other objects and advantages of the invention will be obvious from the detailed description of a preferred embodiment given herein below.

SUMMARY OF THE INVENTION

The aforementioned objects are realized by the preferred embodiment of the invention which comprises a time delay mercury switch wherein the "full on" and "full off" conditions are delayed by a time interval determined by a constriction which produces a pressure imbalance between two communicating chambers. One chamber includes a pair of electrode contacts which are positioned approximately midway between the high and low mercury levels. Actuation of the switch to the "on" position tilts the assembly so as to allow mercury to begin filling the chamber containing the electrode contacts. A second separate section of the assembly contains a pair of contants which close immediately upon actuation of the switch. These contacts actuate a gradual conduction angle circuit which slowly applies power to the load. The gradual conduction angle circuit is mounted to the same assembly so that only two rotational mechanical contacts are required. An alternative embodiment includes a continuous dimming potentiometer for controlling the quiescent "on" state intensity.

DETAILED DESCRIPTION OF THE PREFERRED EMBODIMENT

Figure 1:
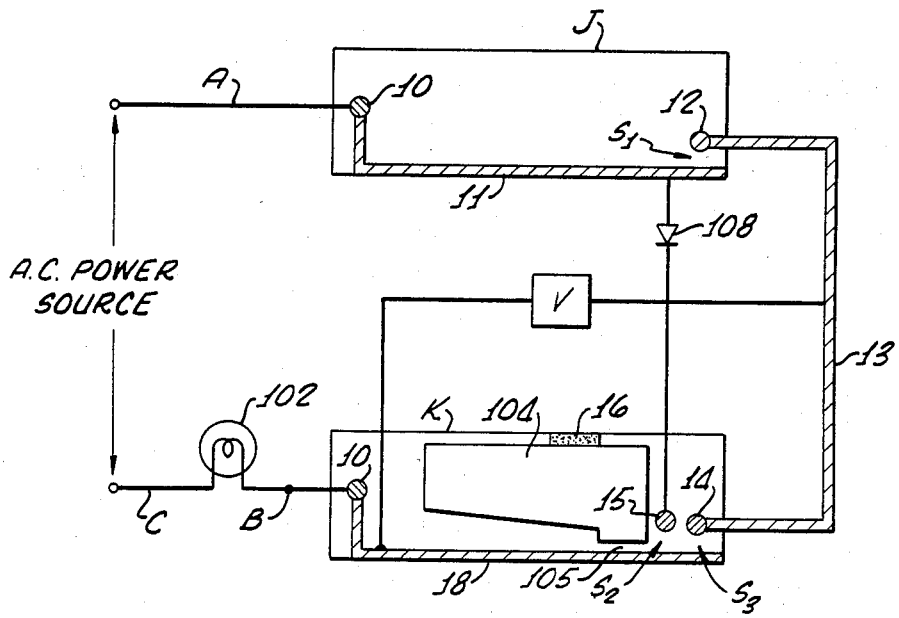
FIG. 1 shows the electromechanical configuration of a preferred embodiment of the invention.
Figure 2:
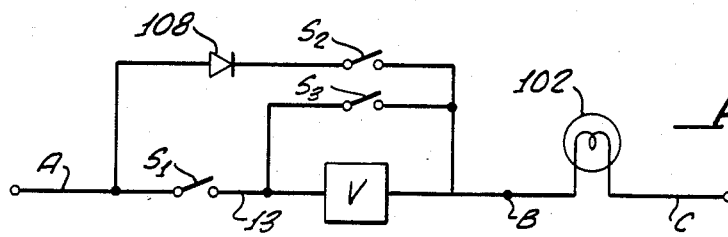
FIG. 2 shows a circuit schematic of the switching arrangement.
Figure 3:
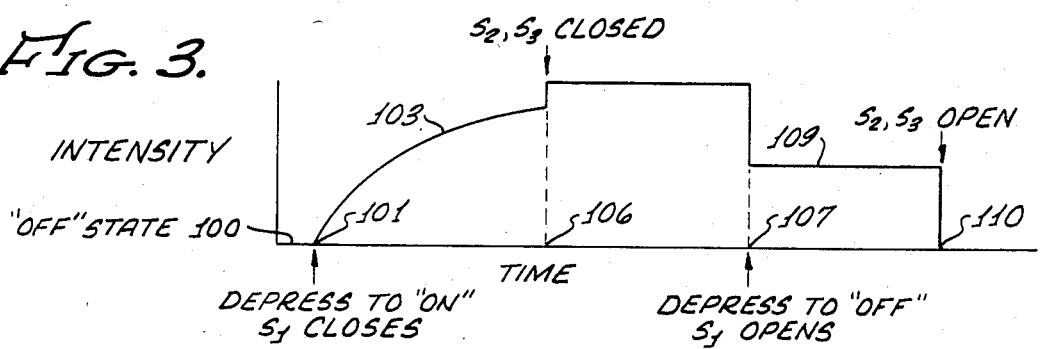
FIG. 3 is a graph illustrating switching states and intensity relationships as a function of time.
Figure 7A:
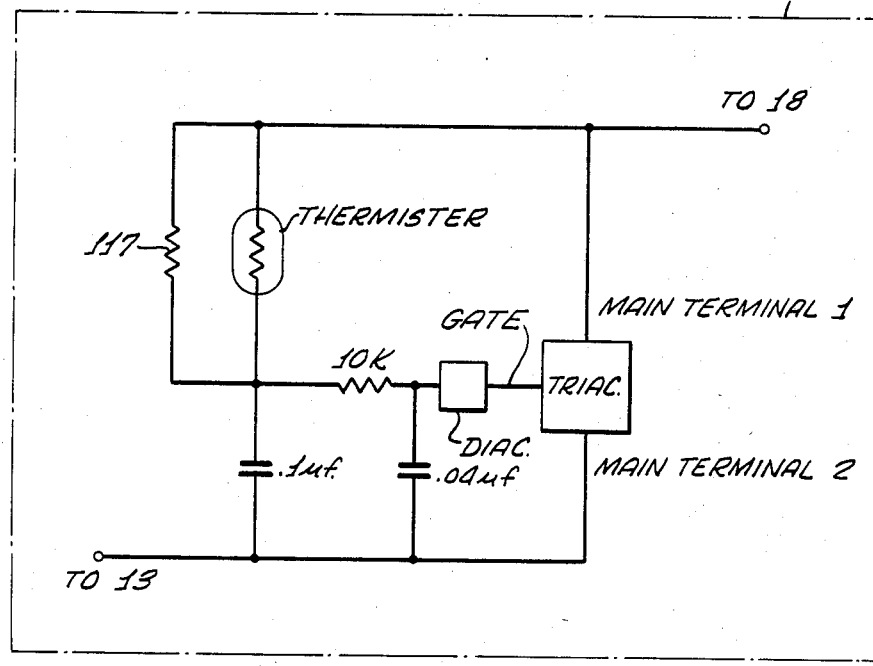
FIG. 7a shows a schematic of a gradual conduction angle circuit.

Adverting to the drawings, the basis operation of the invention can best be understood by reference to FIGS. 1, 2 and 7. The desired characteristics shown in FIG. 3 are achieved using two separate chambers, J and K, each of which is adapted to hold a small quantity of conducting fluid such as mercury. Both chambers are pivotally mounted for rotation about an axis 10 which is coincident with the switch terminals A and B. One contact of each of the internal switches $S_1$, $S_2$ and $S_3$ comprises an electrode (12, 15 and 14 respectively) which will contact the mercury at a predetermined level. The other $S_1$ electrode comprises the conducting surface 11 which remains in contact with the mercury in the J chamber, and the common $S_2$ and $S_3$ electrode is comprised of a similar conducting surface 18 which remains in contact with the mercury in the K chamber. The interconnection between $S_1$ and $S_2$ is through conductor 13.

Figure 4A:
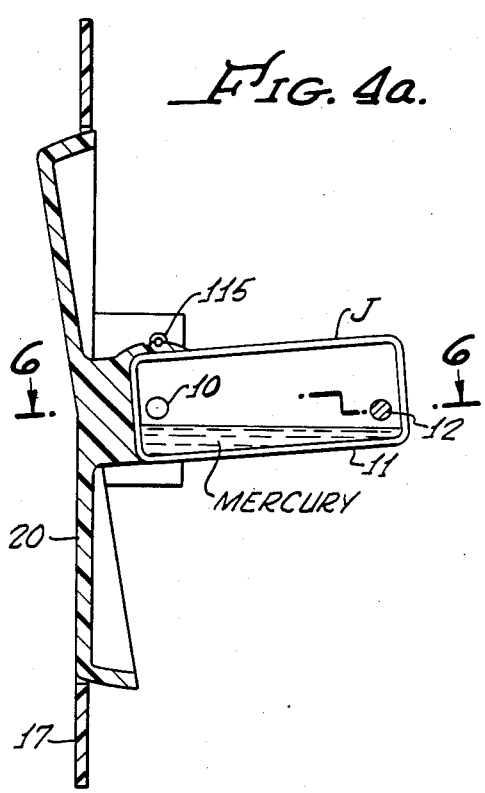
FIG. 4a shows a cross-section of the "J" part of the assembly in the "off" state.
Figure 4B:
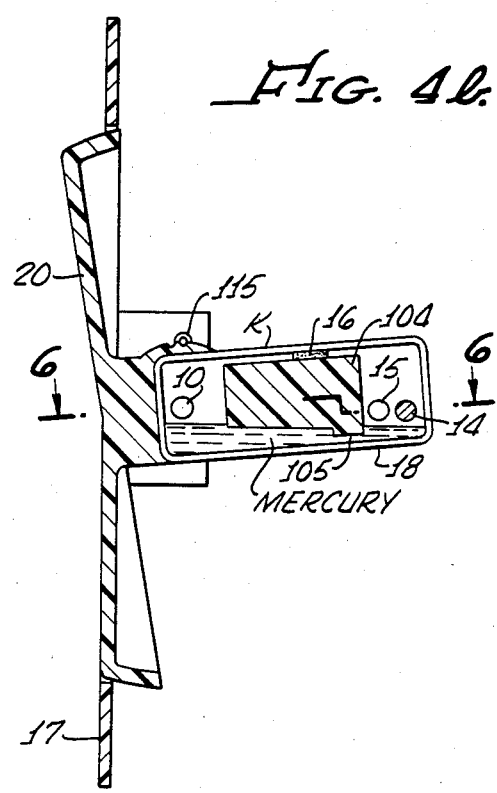
FIG. 4b shows a cross-section of the "K" part of the assembly in the "off" state.

When the chambers J and K are tilted so that the mercury is in contact with only 11 and 18, the switches $S_1$, $S_2$ and $S_3$ will be in the open state as indicated in FIG. 2. This situation is depicted in FIGS. 4a and 4b—which shows the electrode contacts 12 above the mercury level in the chamber J and contacts 14 and 15 above the mercury level in chamber K. This is the quiescent "off state" 100 shown in FIG. 3.

Figure 5A:
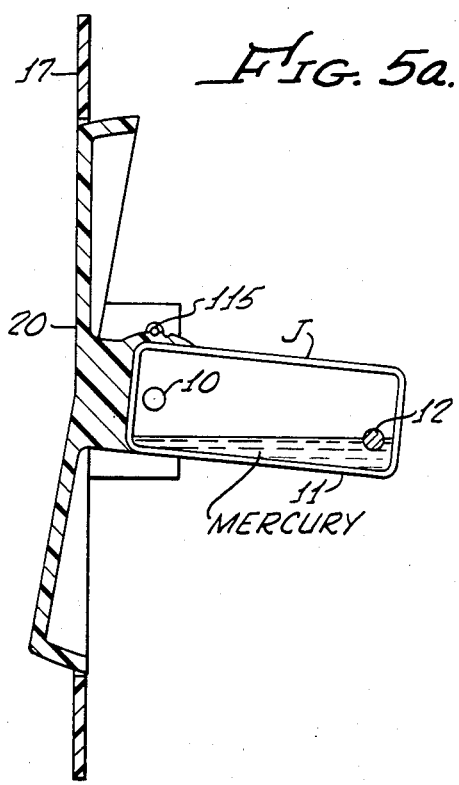
FIG. 5a shows a cross-section of the "J" part of the assembly in the "on" state.
Figure 5B:
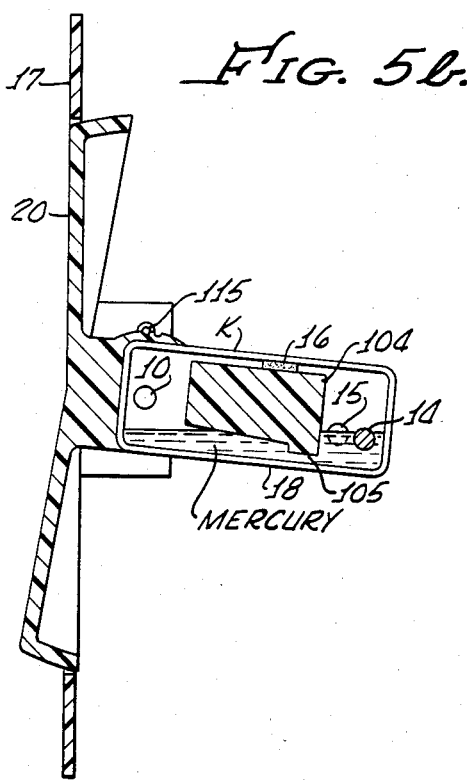
FIG. 5b shows a cross-section of the "K" part of the assembly in the "on" state.

When the upper portion of the plate 20 is depressed to the position shown in FIGS. 5a and 5b, the "turn-on" cycle is initiated. Timewise, this commences at the point 101 of FIG. 3. Functionally, the mercury of the J chamber immediately travels downhill to touch electrode 12 as shown in FIG. 5a, thus closing $S_1$ so as to apply power to the gradual conduction angle circuit V shown in FIG. 7. The power applied across the terminals 13 and 18 causes the thermistor resistance to decrease as a result of self heating—thus gradually increasing the conduction angle as more fully explained in the cross-referenced patents. The power applied to the load (lamp 102) continues to increase as the conduction angle increases—causing the intensity of the lamp 102 to change as indicated by the curve 103.

When the plate 20 is depressed to actuate $S_1$, the mercury in the K chamber does not immediately move downhill to submerge electrodes 14 and 15. The actual delay is determined by the size of the air constriction 16. This constriction may be a membrane, or other semiporous substance such as compacted fibers which will limit the rate of air flow between the two halves of the K cavity defined by the structure 104. As the air pressure equalizes, mercury is allowed to seep through the small channel at 105, ultimately contacting the electrodes 14 and 15, thus closing $S_2$ and $S_3$ at the time indicated as 106 in FIG. 3. When this occurs, the variable conduction angle circuit is shorted and the full value of the AC voltage appears across the lamp 102. Eventually the electrodes 14 and 15 become totally submerged as shown in FIG. 5b.

Depressing the bottom portion of the plate 20, initiates the start of the "off" cycle as indicated by the time point 107 in FIG. 3. The mercury in the J cavity immediately flows to the position shown in FIG. 4a, thus opening $S_1$. $S_2$ and $S_3$, however, continue to remain closed because of the delay produced by the constriction 16. Current thus flows through diode 108 during one half of the AC cycle, thus causing the lamp 102 to operate at half power as indicated by the level 109 in FIG. 3. Eventually, the mercury level drops below that of the contacts 14 and 15, causing $S_2$ and $S_3$ to open simultaneously at the time point 110 of FIG. 3. The mercury level will eventually return to the quiescent off state condition shown in FIG. 4b.

Figure 6:
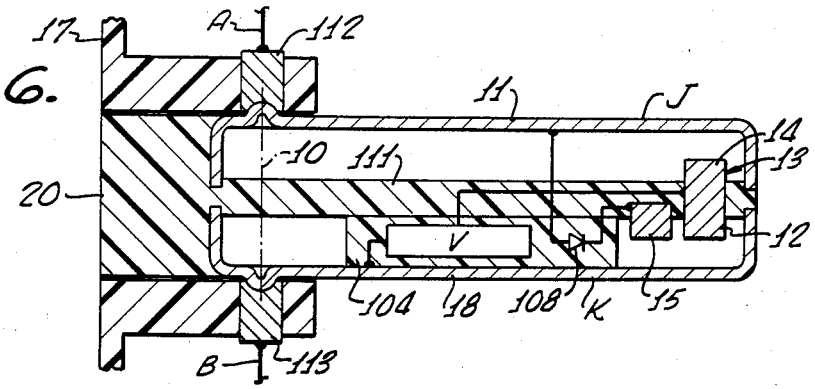
FIG. 6 shows a cross-section taken through the plane 6—6 of FIGS. 4a and 4b.
Figure 8:
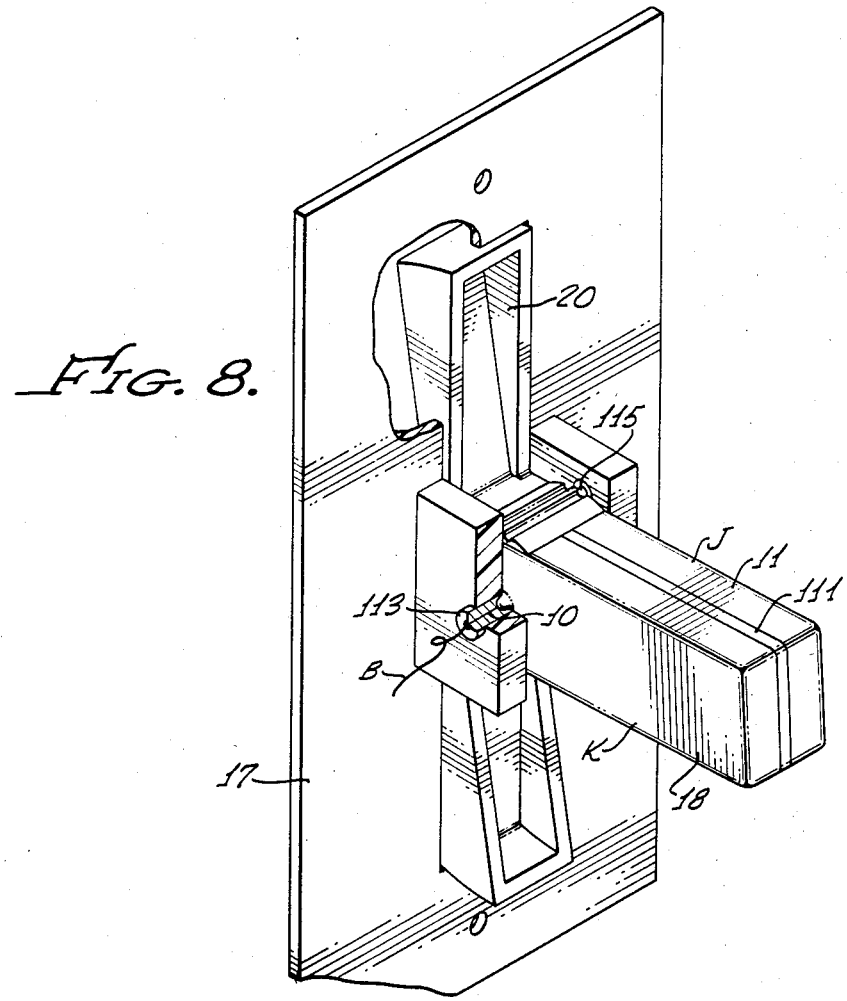
FIG. 8 shows a perspective view of the switch and wall plate.

FIG. 6 shows the details of a preferred mechanical construction wherein the J and K chambers are made from a conducting metal such as copper which functions as the electrodes 11 and 18 respectively. The two halves are separated by an insulator 111. The interconnecting electrodes 12 and 14 are formed from a single conducting rod 13. The electrode 15 is formed from a similar shorter rod which is internally connected through printed circuitry to the diode 108. The gradual conduction angle circuit V is internally connected through printed circuitry to conducting rod 13. The mounting plate housing assembly 17 contains two pivotal contacts 112 and 113 which support the entire assembly for rotation about axis 10. The complete assembly is shown in FIG. 8.

An important advantage of the preferred embodiment lies on the fact that only two pivotal contacts 112 and 113 are required to achieve the desired functions. Because all of the internal connections and circuitry are mounted to the movable portion, there is no necessity for flexible leads. In addition, the location of the $S_1$, $S_2$ and $S_3$ contacts near the end of the J and K cavities results in a large travel (change in height) for a given angular change about the axis 10. As a consequence, reliable switching can occur even though the switch plate 20 travel distance is small. This feature is highly desirable and advantageous with respect to prior art mercury switches which utilize a protruding level (in lieu of a switch plate 20) which must be moved through an arc of approximately 90 degrees. In order to insure complete travel to the "off" or "on" positions, a detent arrangement 115 is included. The valleys on each side of the cusp provide two stable mechanical states. Partial switching is precluded by the spring-loaded ball which forces the plate 20 to the "off" or "on" position.

Figure 7B:
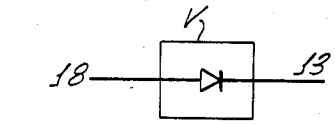
FIG. 7b shows an alternative embodiment employing a single diode in place of the gradual conduction angle circuit.
Figure 7C:
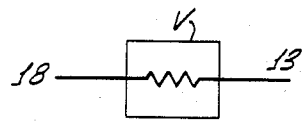
FIG. 7c shows an alternative embodiment employing a single current limiting resistor in place of the gradual conduction angle circuit.
Figure 9:
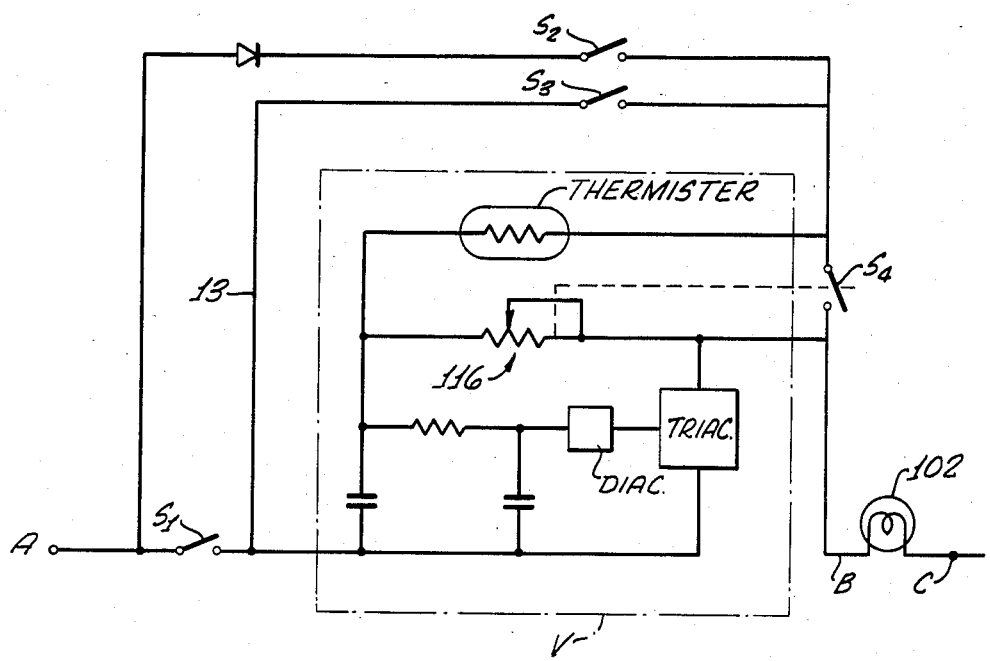
FIG. 9 shows a schematic diagram of an embodiment for effecting dimming.
Figure 10:
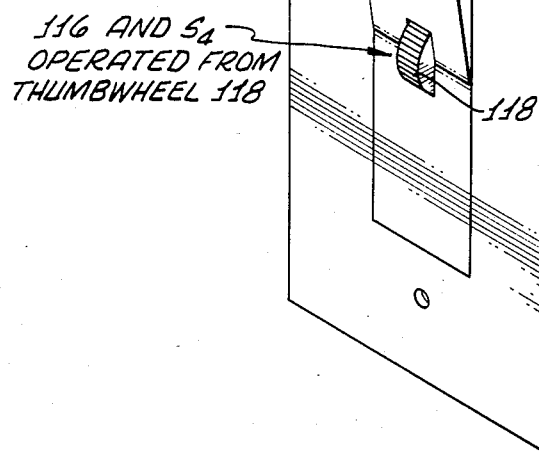
FIG. 10 shows a perspective view illustrating the placement of the dimming potentiometer thumbwheel.

Having shown and described a preferred embodiment, it will be evident to those skilled in the art that many changes and substitutions can be made in the manner of achieving the desired results and in the results themselves. Thus, the variable conduction angle circuit may be replaced with any number of circuits which utilize capacitors or other devices to achieve a gradual change in conduction. In some cases, it may be advantageous to replace the entire circuit V with a single diode (as shown in FIG. 7b) or resistor (as shown in FIG. 7c), particularly where preheating to avoid filament burn-out is the objective rather than the esthetic appeal of a progressively increasing intensity. It is also possible to increase the utility of the apparatus by adding a potentiometer 116 in place of the padding resistor 117 and a pair of mechanical switch contacts $S_4$ as shown in FIG. 9. The switch $S_4$ and potentiometer 116 can be operated by a thumbwheel 118 located in the geometric center of the switch plate 121 as shown in FIG. 10. When the switch plate 121 is depressed so as to close $S_1$, the thumbwheel can be rotated downwardly to open $S_4$ and increase 116. In this mode the gradual conductional angle circuit is converted to a conventional dimmer, and the switch plate 121 functions to instantly burn the lamp 102 from "off" to "on"—with the "on" intensity being determined by the setting of potentiometer 116. It will be understood that the metal chamber 18 (shown in FIG. 6) would be replaced by one having an insulated section between the pivotal contact at 113 and that the switch $S_4$ would short across the insulated section until opened by the downward rotation of the thumbwheel 118.

Thus, although a preferred embodiment has been shown and described, it will be understood that the invention is not limited thereto, and that numerous modifications and changes may be made without departing from the spirit of the invention.

We claim:

1. A switching apparatus having an "on" state and an "off" state comprising:
   actuating means for mechanically changing said switching apparatus from one state to another;
   a first pair of contacts having a first electrode terminal and a second electrode terminal;
   means for closing said first pair of contacts at the time said actuating means is operated to cause said switching apparatus to change from the "off" state to the "on" state;
   a second pair of contacts having a first electrode terminal and a second electrode terminal;
   means for delaying the closing of said second pair of contacts until after said first pair of contacts have closed;
   a two terminal variable conduction angle network having a first terminal connected to the first electrode terminal of said first pair of contacts;

means for connecting first electrode terminal of said first pair of contacts to said first electrode terminal of said second pair of contacts;

means connecting said second terminal of said second pair of contacts to the second terminal of said two terminal variable conduction angle network.

2. The apparatus recited in claim 1 wherein said means for delaying the closure of said second pair of contacts until after said first pair of contacts have closed comprises:

a housing having an elongated chamber partially filled with mercury, and wherein at least one of said two electrode terminals of said second pair of contacts is positionally located at one end of said elongated chamber;

means for pivotally mounting the other end of said housing about an axis perpendicular to said elongated chamber;

means connecting said actuating means to said housing so as to cause said housing to rotate so as to lower said second pair of contacts when said actuating means is operated to turn said switching apparatus "on";

means for delaying the rise of the mercury level in the vicinity of said second pair of contacts.

3. The apparatus recited in claim 2 wherein said means for delaying the rise of the mercury level in the vicinity of said second pair of contacts comprises:

an obstruction between the extremities of the elongated chamber having a first lower opening below the mercury level and a second upper opening above the mercury level, and means for limiting the rate of airflow through the upper opening whereby the rate of mercury flowing through said lower opening will be limited.

4. The apparatus recited in claim 3 including:

a third pair of contacts having a first electrode terminal and a second electrode terminal;

a diode connected between said first electrode terminal of said third pair of contacts and said second electrode terminal of said first pair of contacts;

means for connecting said second electrode terminal of said third pair of contacts to said second electrode terminal of said second pair of contacts;

means for opening said first pair of contacts at the time said actuating means is operated to cause said switching apparatus to change from the "on" state to the "off" state;

means for delaying the opening of said third pair of contacts until after said first pair of contacts are opened.

5. A switching device comprising:

a first pair of mercury contacts adapted to close at the time said switching device is actuated to the "on" position, and adapted to open at the time said switching device is actuated to the "off" position;

a first impedance network connected in series with said first pair of mercury contacts;

a second pair of mercury contacts connected to short across said first impedance network;

means for delaying the closure of said second pair of mercury contacts until after said first pair of mercury contacts are closed.

6. The apparatus recited in claim 5 including:

a second impedance network;

a third pair of mercury contacts connected in series with said second impedance network;

means connecting said third pair of mercury contacts and said series connected second impedance network in parallel with said first pair of mercury contacts and said series connected first impedance network;

means for delaying the opening of said third pair of mercury contacts until after said first pair of mercury contacts open.

7. The apparatus recited in claim 6 wherein said means for delaying the closure of said second pair of mercury contacts and said means for delaying the opening of said third pair of mercury contacts comprises:

a housing having first and second cavities and a first and second interconnecting opening between said first and second cavities;

a conducting fluid adapted to flow through the first interconnecting opening from the higher to the lower cavity;

means for pivotally mounting said housing so as to cause the first cavity to be higher than the second cavity when said switching device is "on" and for causing the second cavity to be higher than the first cavity when said switching device is "off";

means for restricting the rate of flow through the second interconnecting opening.

* * * * *